Oct. 7, 1969 K. MAAZ 3,470,608

METHOD OF PRODUCING A THERMOELECTRIC DEVICE

Filed March 28, 1966

United States Patent Office 3,470,608

Patented Oct. 7, 1969

3,470,608

METHOD OF PRODUCING A THERMO-ELECTRIC DEVICE

Karl Maaz, Nuremberg, Germany, assignor to Siemens Aktiengesellschaft, Erlangen, Germany, a corporation of Germany Filed Mar. 28, 1966, Ser. No. 537,797
Claims priority, application Germany, May 10, 1965, S 97,013
Int. Cl. B23k *31/02;* B01j *17/00*
U.S. Cl. 29—492 3 Claims

ABSTRACT OF THE DISCLOSURE

Method of producing a thermoelectric device by soldering legs of thermoelectrically active semiconductor material at their end faces to metallic connecting bridges includes sequentially covering the entire surface of the legs with a solderable coating, soldering the legs at their end faces to the metal bridges and etching the coating away from the remaining surface portions of the legs.

My invention relates to a method of producing a thermoelectric device, particularly a Peltier battery for cooling purposes.

Such devices, as a rule, are composed of parallel arranged legs consisting of thermoelectrically active material, such as semiconductor materials of n-type and p-type conductance respectively, each two adjacent legs forming a Peltier couple. The end faces of each two legs are interconnected by a bridge member of electrically good conducting metal so that several couples and bridge members form an electrical series connection.

In the manufacture of such thermoelectric devices, the end faces of the legs to be soldered must first be given a solderable coating since the thermoelectric material does not readily lend itself to direct soldering. The coating is produced, for example, by immersing the end faces in a bath of molten bismuth. This process is the more difficult and troublesome the smaller the cross section of the thermocouple legs.

It is an object of my invention to provide a method for producing thermoelectric devices, such as Peltier batteries for cooling purposes, which greatly minimizes such difficulties and eliminates the danger of frequently occurring faults in the products heretofore encountered.

According to my invention, the thermocouple legs are first covered on their entire surface with a solderable coating and are then joined by soldering at the end faces with the interconnecting bridges of good conducting metal. Thereafter, the coating is etched away from the remaining surface portions of the legs, that is, from all of those localities not soldered together with the metallic bridges.

Since by virtue of the invention the solderable coating need no longer be limited to the end faces of the thermoelectric legs, the method also dispenses with the necessity of securing the legs in a definite position during deposition of the coating. This considerably simplifies and expedites the production of such thermoelectric devices, especially in cases where the legs have very small cross sections, for example 10 $mm.^2$ or less.

It is preferable to deposit the solderable coating in form of a nickel plating. The nickel coating may be produced electrolytically by the conventional drum process or preferably by the non-electrolytic (currentless) process. Plating baths for currentless nickel plating, containing nickel chloride and/or nickel sulfate with an addition of sodium hyperphosphite as active ingredient, are known as such.

An embodiment of a method according to the invention will be described by way of example with reference to the accompanying drawings in which.

Figures 1, 2, 3, 4, 5:
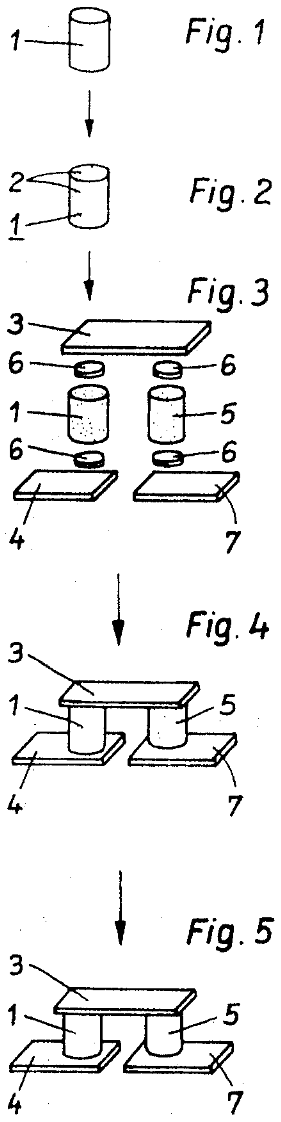
FIGS. 1 and 2 show an individual thermocouple leg before and after applying the solderable coating, respectively.
FIG. 3 is an exploded representation of an arrangement of components involved in the method.
FIG. 4 illustrates schematically a thermocouple according to FIG. 3 in soldered condition.
FIG. 5 shows the same thermocouple with the solderable coating etched away from the exposed peripheral surfaces of the legs.

Referring to FIG. 1, there is shown a cylindrical thermocouple leg consisting, for example, of an n-type semiconductor formed of halogen-doped bismuth telluride. The leg 1 is first covered by currentless nickel plating with a nickel coating 2 of about 5 micron thickness.

Thus prepared, the leg 1 is to be soldered together with two metallic bridges 3 and 4 as shown in FIG. 3. Each of these bridges, in the finished Peltier battery, is further connected with a leg having the opposite type of conductivity, namely p-type conductivity. One of these p-type legs is shown in FIG. 3 at 5. The leg 5 preferably consists of a mixed crystal of bismuth telluride and bismuth antimonide. The leg 5, too, is provided with a nickel coating for preparing the subsequent soldering operation. Shown in FIG. 3 are further four circular wafers 6 of soft solder foil, such as a solder on tin base, which are to be placed between the respective end faces of the legs 1, 5 and the metallic bridges 3, 4 and 7.

For soldering, the assembly of components 1 to 7 is accommodated in a holder or jig and heated. The resulting soldered assembly is shown in FIG. 4. As a rule, further thermoelement legs and metal bridges are simultaneously joined with the bridges 4 and 7, these further parts being not illustrated because their arrangement is conventional and not essential to the present invention proper.

When the condition of FIG. 4 is reached, the peripheral surfaces of the thermocouple legs 1 and 5 still carry the nickel coatings. These must be removed. For this purpose, the completely soldered assembly is immersed in an etching bath consisting, for example, of 4-normal nitric acid. Upon dissolution of the exposed nickel coating, the device is rinsed with water and dried. Now the device, shown in FIG. 5, is substantially ready for use. As a rule, the deivce consisting of thermocouple elements and bridges is embedded in an insulating mass for example synthetic casting resin, leaving the top and bottom faces of the bridges on both sides of the device exposed to the environment for the purpose of dissipating or receiving heat.

Upon a study of this disclosure it will be obvious to those skilled in the art that the particular shape, size or number of the components used is subject to modification and that in these and related respects my invention may be given embodiments other than particularly illustrated and described herein, without departing from the essential features of my invention and within the scope of the claims annexed hereto.

I claim:

1. In the method of producing a thermoelectric device by soldering legs of thermoelectrically active semiconductor material at their end faces to metallic connecting bridges, the improvement which comprises first covering the entire surface of the legs with a solderable coating, then soldering the legs at their end faces to the metal bridges, and thereafter etching the coating away from the remaining surface portions of the legs.

2. The method according to claim 1, wherein the solderable coating is formed by nickel plating.

3. The method according to claim 1 for producing a Peltier cooling deivce, wherein said legs are formed of n-type bismuth-telluride material and of p-type mixed crystal material of bismuth-telluride and bismuth-antimonide, and which comprises producing said coating from nickel and placing wafers of soft solder between each of said end faces and the adjacent bridge for soldering the legs to said bridge.

References Cited

UNITED STATES PATENTS

| | | | |
|---|---|---|---|
| 2,793,145 | 5/1957 | Clarke. | |
| 3,046,176 | 7/1962 | Bosenberg. | |
| 3,092,522 | 6/1963 | Knowles et al. | 117—212 X |
| 3,154,450 | 10/1964 | Hoeckelman et al. | 117—212 X |
| 3,249,470 | 5/1966 | Naake | 29—473.1 X |
| 3,269,861 | 8/1966 | Schneble et al. | 117—212 |
| 3,287,794 | 11/1966 | Van Hise | 29—473.1 X |
| 3,330,029 | 7/1967 | Duncan et al. | 29—573 |

JOHN F. CAMPBELL, Primary Examiner

J. L. CLINE, Assistant Examiner

U.S. Cl. X.R.

29—573